March 16, 1926.

H. S. PLAIN

TRICYCLE TOY

Filed August 19, 1925

1,577,149

INVENTOR

H. S. PLAIN

BY

Patented Mar. 16, 1926.

1,577,149

UNITED STATES PATENT OFFICE.

HENRY STANLEY PLAIN, OF TORONTO, ONTARIO, CANADA.

TRICYCLE TOY.

Application filed August 19, 1925. Serial No. 51,219.

*To all whom it may concern:*

Be it known that I, HENRY STANLEY PLAIN, a subject of the King of Great Britain, and a resident of the city of Toronto, in the county of York, in the Province of Ontario, Canada, have invented certain new and useful Improvements in Tricycle Toys, of which the following is the specification.

My invention relates to improvements in tricycle toys, and the object of the invention is to devise a simple construction, cheap to manufacture, and easily operated and controlled, and it consists essentially of the arrangement and construction of parts as hereinafter more particularly explained.

In the drawings like characters of reference indicate corresponding parts in each figure.

Figure 2:
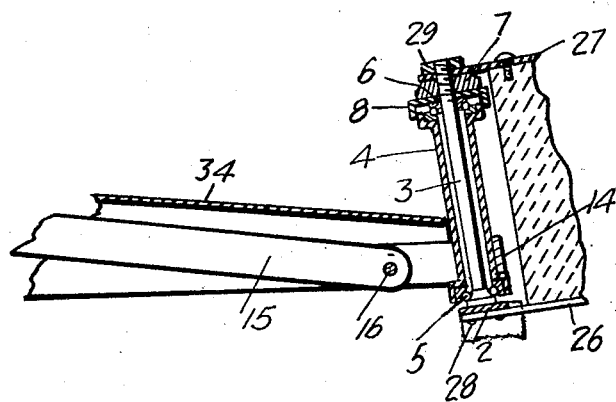
Fig. 2 is an enlarged sectional detail showing the steering post construction.
Figure 1:
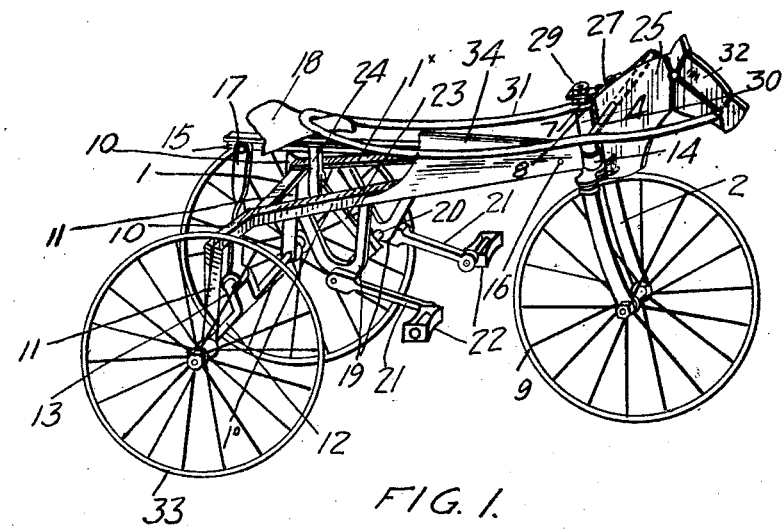
Fig. 1 is a perspective view of my toy.

1 indicates a triangular frame. 2 are front forks similar in construction to a bicycle fork and provided with a centre stem 3.

4 is a bearing sleeve forming the steering post through through which the stem 3 extends, being supported therein at each end of the sleeve by ball bearings 5 and 6.

7 is a nut at the upper end of the stem screwed down against the top cap 8 of the upper bearing 6.

9 is the front or steering wheel journalled in the fork 2. The side bars 1$^x$ and 1° of the main frame 1 are provided with lateral extensions 10 provided with depending portions 11 in which is mounted the rear axle 12 which is offset intermediately of its length to form a crank arm 13.

The front portion or apex of the triangular frame 1 is formed into a loop 14 which is clamped around the sleeve 4 so as to be secured thereto.

15 is a bar pivotally mounted on a cross bolt 16 at its front end between the side bars 1$^x$ and 1° of the main frame.

17 is a link connecting the rear end of the bar 15 to the crank arm 13.

18 is a saddle which is mounted upon the bar 15 and secured thereto by any suitable means.

19 are brackets secured to the side bars 1$^x$ and 1° of the main frame so as to depend therefrom.

20 is a pedal shaft journalled in the brackets 19, and 21 are pedal arms secured to the ends of the shaft 20 provided with suitable pedals 22.

23 is an arm secured to the pedal shaft 20 and pivotally connected at its opposite end to a bar 24 rigidly secured to the bar 15 adjacent the saddle 18 so as to depend therefrom.

25 is a head of a horse or other animal.

26 and 27 are bars secured to the head 25, the bar 26 being rigidly secured to the fork 2 as indicated at 28, the bar 27 mounted upon the stem 3 above the nut 7 being secured thereon by the nut 29 screwed onto the upper end of the stem 3.

30 is a rod extending transversely through the head 25 adjacent to the steering post formed by the sleeve 4.

31 are reins. The free ends of the reins are secured to the head of the horse at 32, each rein being secured to an extreme end of the rod 30, the reins extending backward adjacent to the saddle 18.

33 are the rear wheels mounted on the ends of the crank shaft 12.

Having described the principal parts involved in my invention I will briefly describe the operation of the same.

When the weight of the rider bears upon the pedals 22 the pedals are depressed and through the arm 23 the saddle 18 is raised carrying the free end of the rod 15 upward exerting a pull upon the link 17 so as to carry the crank 13 over its centre. By release of pressure upon the pedals so that the weight of the rider is then carried upon the saddle 18, such saddle is depressed carrying the free end of the bar 15 downward thereby exerting pressure upon the link 17 so as to carry the crank 13 around and complete the driving movement, pressure upon the pedals and the saddle being alternately exerted so as to impart a complete revolution to the crank 13, shaft 12 and the wheels 33. By providing the cross rod 30 the front wheel 9 may be easily steered so that the direction may be readily controlled.

In order to shield the child's fingers so that they can not be inadvertently inserted between the rod 15 and the main frame I have provided a housing 34 secured to the side bars 1$^x$ and 1° of the main frame and extending over the bar 15 and sufficiently spaced apart from the top of the bar to obviate any danger of the child's fingers being caught between the bar and the housing.

From the description it will be seen that

I have devised a very simple form of tricycle toy which may be easily operated by the child when employing a riding movement similar to that of ordinary horse back riding which may be easily controlled and which will be simple and cheap to manufacture.

What I claim as my invention is:

1. A tricycle toy comprising a front steering wheel and a pair of rear driving wheels, a fork in which the front wheel is mounted provided with a steering post in which the fork is journalled, a triangular frame connected at its apex to the steering post, a shaft extending between the rear driving wheels, a bar pivotally mounted in the main frame at its apex, a saddle mounted upon the free end of the bar, a rock shaft, means for supporting the rock shaft from the main frame, pedal arms and pedals mounted upon the rock shaft, means operated by alternate pressure upon the pedals and saddle for driving the rear wheels, and means for controlling the direction of the steering wheel.

2. A tricycle toy comprising a front steering wheel and a pair of rear driving wheels, a fork in which the front wheel is mounted provided with a steering post in which the fork is journalled, a triangular frame connected at its apex to the steering post, a crank shaft extending between the rear driving wheels, a saddle carrying bar pivotally mounted in the main frame at its apex, a saddle mounted upon the free end of the bar, a link connecting the rear end of the bar with the crank of the crank shaft, a rock shaft, means for supporting the rock shaft from the main frame, pedal arms and pedals mounted upon the rock shaft, an arm extending rearwardly from the rock shaft, a pivotal connection between the opposite end of the arm and the saddle carrying bar, means operated by alternate pressure upon the pedals and saddle for driving the rear wheels, and means for controlling the direction of travel of the steering wheel.

3. A tricycle toy comprising a front steering wheel and a pair of rear driving wheels, a fork in which the front wheel is mounted provided with a steering post in which the fork is journalled, a triangular frame connected at its apex to the steering post, a crank shaft extending between the rear driving wheels, a saddle carrying bar pivotally mounted in the main frame at its apex, a saddle mounted upon the free end of the bar, a link connecting the rear end of the bar with the crank of the crank shaft, a rock shaft, means for supporting the rock shaft from the main frame, pedal arms and pedals mounted upon the rock shaft, an arm extending rearwardly from the rock shaft, a pivotal connection between the opposite end of the arm and the saddle carrying bar, means operated by alternate pressure upon the pedals and saddle for driving the rear wheels, an animal head rigidly secured to the fork of the steering wheel, a rod extending transversely of the head adjacent the steering post, and reins extending from the end of the rod adjacent to the saddle.

HENRY STANLEY PLAIN.